(12) United States Patent
San Martin et al.

(10) Patent No.: US 9,002,907 B2
(45) Date of Patent: Apr. 7, 2015

(54) METHOD AND SYSTEM FOR STORING BINARY LARGE OBJECTS (BLOBS) IN A DISTRIBUTED KEY-VALUE STORAGE SYSTEM

(75) Inventors: Marcelo San Martin, Alviso, CA (US); Patricio Echague, San Francisco, CA (US); Amit Sinha, Fremont, CA (US); Indranath Ghosh, Santa Clara, CA (US); Yewei Zhang, Fremont, CA (US)

(73) Assignee: Unwired Planet, LLC, Reno, NV (US)

( * ) Notice: Subject to any disclaimer, the term of this patent is extended or adjusted under 35 U.S.C. 154(b) by 293 days.

(21) Appl. No.: 12/978,464

(22) Filed: Dec. 24, 2010

(65) Prior Publication Data

US 2012/0054197 A1 Mar. 1, 2012

Related U.S. Application Data

(60) Provisional application No. 61/378,370, filed on Aug. 30, 2010.

(51) Int. Cl.
G06F 17/30 (2006.01)

(52) U.S. Cl.
CPC ............................... *G06F 17/30486* (2013.01)

(58) Field of Classification Search
None
See application file for complete search history.

(56) References Cited

U.S. PATENT DOCUMENTS

| | | | |
|---|---|---|---|
| 6,119,123 A | 9/2000 | Elenbaas et al. | |
| 7,467,163 B1 | 12/2008 | Dodds et al. | |
| 7,983,913 B2 * | 7/2011 | Seltzer et al. | 704/251 |
| 2003/0028509 A1 | 2/2003 | Sah et al. | |
| 2005/0097077 A1 | 5/2005 | Bolosky et al. | |
| 2009/0182767 A1 | 7/2009 | Meadway et al. | |
| 2009/0240793 A1 * | 9/2009 | Zhang et al. | 709/223 |
| 2010/0042645 A1 * | 2/2010 | Bakalash et al. | 707/102 |
| 2012/0054734 A1 * | 3/2012 | Andrews et al. | 717/171 |

OTHER PUBLICATIONS

"Dynamo: Amazon's highly available key-value store" by DeCandia et al. Oct. 14-17, 2007.*
International Search Report and Written Opinion, PCT/US2011/049613, Jan. 18, 2012.
Avinash Lakshman, Prashant Malik, "Cassandra—A Decentralized Structured Storage System", p. 16.
Fay Chang, Jeffrey Dean, Sanjay Ghemawat, Wilson C. Hsieh, Deborah A. Wallach, Mike Burrows, Tushar Chandra, Andrew Fikes, Robert E. Gruber, "Bigtable: A Distributed Storage System for Structured Data", 2006, p. 1-14.

(Continued)

*Primary Examiner* — James Trujillo
*Assistant Examiner* — Miranda Huang

(57) ABSTRACT

A technique for storing binary large objects (BLObs) in a distributed key-value storage system is disclosed. In an embodiment, the storage of BLObs involves dividing the BLObs into smaller "BLOb chunks" and storing the BLOb chunks in storage nodes of the distributed key-value storage system. A BLOb is first associated with a key, referred to as a "BLOb key," and each subsequent BLOb chunk is associated with a different unique key, referred to as a "BLOb chunk key." A list of the BLOb chunks keys is maintained and all of the BLOb chunks of the BLOb can be retrieved from the distributed key-value storage system using the BLOb chunks key list.

14 Claims, 13 Drawing Sheets

(56) References Cited

OTHER PUBLICATIONS

Giuseppe DeCandia, Deniz Hastorun, Madan Jampani, Gunavardhan Kakulapati, Avinash Lakshman, Alex Pilchin, Swaminathan Sivasubramanian, Peter Vosshail and Werner Vogels, "Dynamo: Amazon's Highly Available Key-value Store", SOSP, Oct. 14-17, 2007, p. 205-220.

Diana Moise, Gabriel Antoniu, Luc Bouge, "Large-Scale Distributed Storage for Highly Concurrent MapReduce Applications", IPDPS: PhD Forum 2010, p. 1-4.

N. Bogdan, G. Antoniu, L. Bouge; "BlobSeer: Efficient Data Management for Data-Intensive Applications Distributed at Large-Scale"; version 1, Feb. 18, 2010, p. 1-4.

* cited by examiner

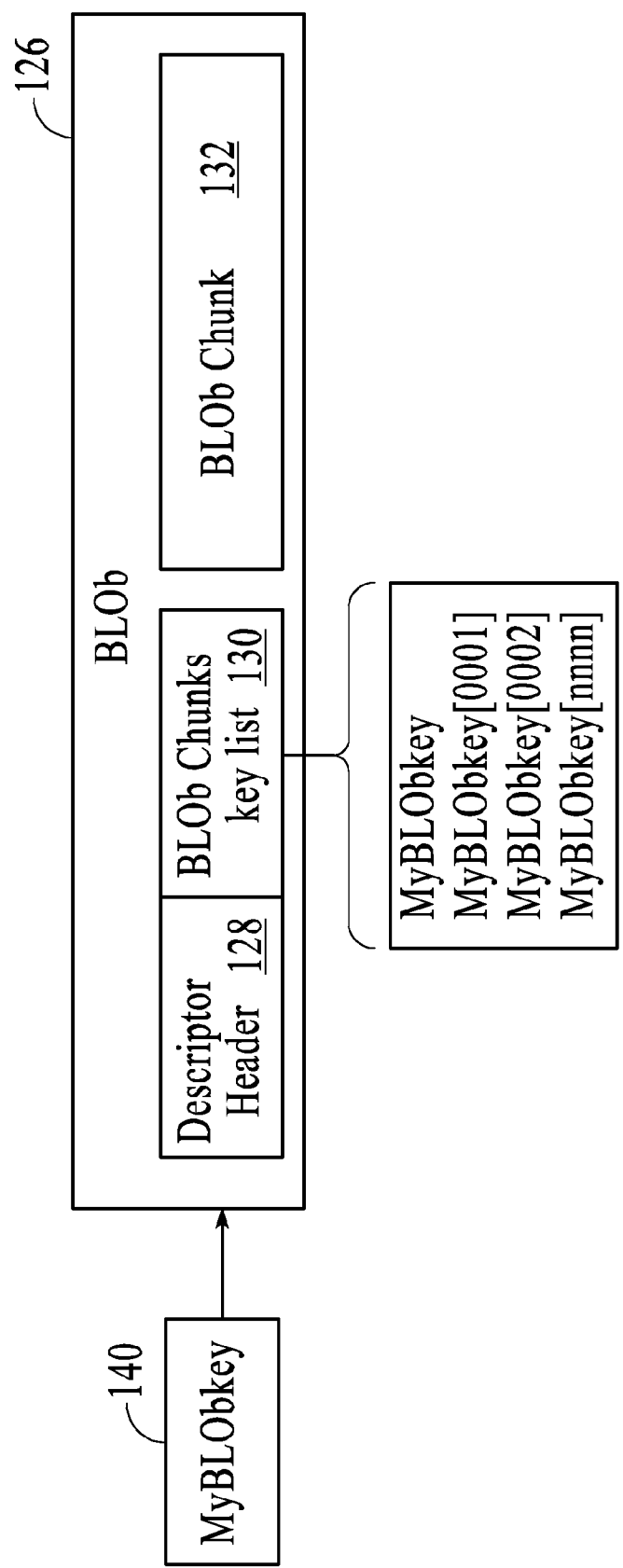
FIG. 3D/1

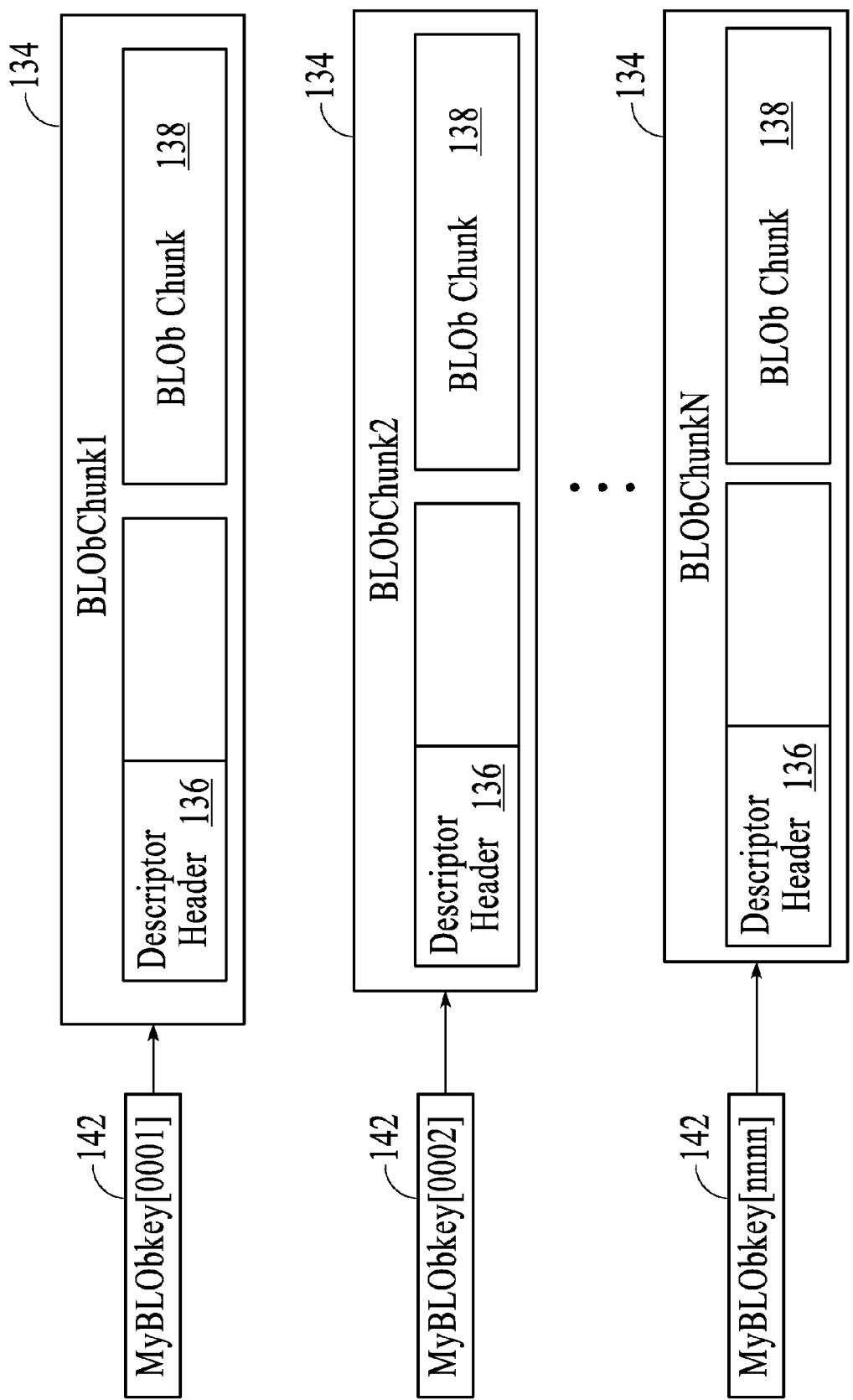
FIG. 3D/2

METHOD AND SYSTEM FOR STORING BINARY LARGE OBJECTS (BLOBS) IN A DISTRIBUTED KEY-VALUE STORAGE SYSTEM

CROSS-REFERENCE TO RELATED APPLICATION

This application is entitled to the benefit of provisional U.S. Patent Application Ser. No. 61/378,370, filed Aug. 30, 2010, which is incorporated by reference herein.

BACKGROUND

Distributed key-value storage systems are database management systems that have recently been developed to handle the storage of massive amounts of data. These distributed key-value storage systems use commodity hardware and are easily and massively scalable.

Some types of digital data consist of large objects that need to be stored in a database management system as a single entity. For example, digital media, such as images, music, and videos, are typically managed as single entities in a database management system. These entities are often referred to as binary large objects, or "BLObs" (or "BLOBs" or "Blobs"). Distributed key-value storage systems are increasingly being used to store digital media, such as BLObs. With the growing use of distributed key-value storage systems to store large amounts of digital media, there is a need to adapt distributed key-value storage systems to efficiently manage BLOb storage.

SUMMARY

In accordance with an embodiment of the invention, the storage of BLObs in a distributed key-value storage system involves dividing the BLObs into smaller "BLOb chunks" and storing the BLOb chunks in storage nodes of the distributed key-value storage system. In order to ensure that a BLOb can be managed as a single entity even though the BLOb is divided into BLOb chunks, a BLOb is first associated with a key, referred to as a "BLOb key," and each subsequent BLOb chunk is associated with a different unique key, referred to as a "BLOb chunk key." A list of the BLOb chunk keys is maintained so that the BLOb can continue to be managed as a single entity. In particular, a BLOb chunks key list is maintained within the first BLOb chunk so that all of the BLOb chunks of the BLOb can be easily retrieved from the distributed key-value storage system.

An embodiment a method for storing BLObs in a distributed key-value storage system is disclosed. The method involves receiving a stream of a BLOb, associating a key with the BLOb, dividing the BLOb into BLOb chunks as the stream of the BLOb is received, wherein a BLOb chunk comprises a subset of the BLOb, associating a unique BLOb chunk key with each BLOb chunk, storing the BLOb chunks in the distributed key-value storage system according to the BLOb chunk keys, and maintaining a BLOb chunks key list that includes the BLOb chunk keys of the BLOb chunks.

In an embodiment, the distributed key-value storage system comprises multiple storage nodes and the BLOb chunk keys are used to determine the storage node at which a BLOb chunk is stored. For example, the BLOb chunk key of a particular BLOb chunk is hashed to determine the storage node at which the particular BLOb chunk is stored.

In an embodiment, the BLOb is retrieved from the distributed key-value storage system using the BLOb chunks key list.

In an embodiment, a non-transitory storage media that stores computer executable instructions is disclosed. When the instructions are executed by a computer, the instructions implement a method for storing BLObs that involves receiving a stream of a BLOb, associating a key with the BLOb, dividing the BLOb into BLOb chunks as the stream of the BLOb is received, wherein a BLOb chunk comprises a subset of the BLOb, associating a unique BLOb chunk key with each BLOb chunk, storing the BLOb chunks in the distributed key-value storage system according to the BLOb chunk keys, and maintaining a BLOb chunks key list that includes the BLOb chunk keys of the BLOb chunks.

In an embodiment, a method for retrieving BLObs from a distributed key-value storage system is disclosed. The method involves obtaining a BLOb key, indexing a table according to the BLOb key to find a value, obtaining a BLOb chunks key list from the value, wherein the BLOb chunks key list contains BLOb chunks keys that are related to BLOb chunks of the BLOb, using the BLOb chunk keys to index the table, and streaming BLOb chunks of the BLOb according to the BLOb chunk keys.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 3A-3D illustrate the generation of BLOb chunks and a BLOb chunks key list as a BLOb is processed through a service engine, such as the service engine of FIG. 1.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
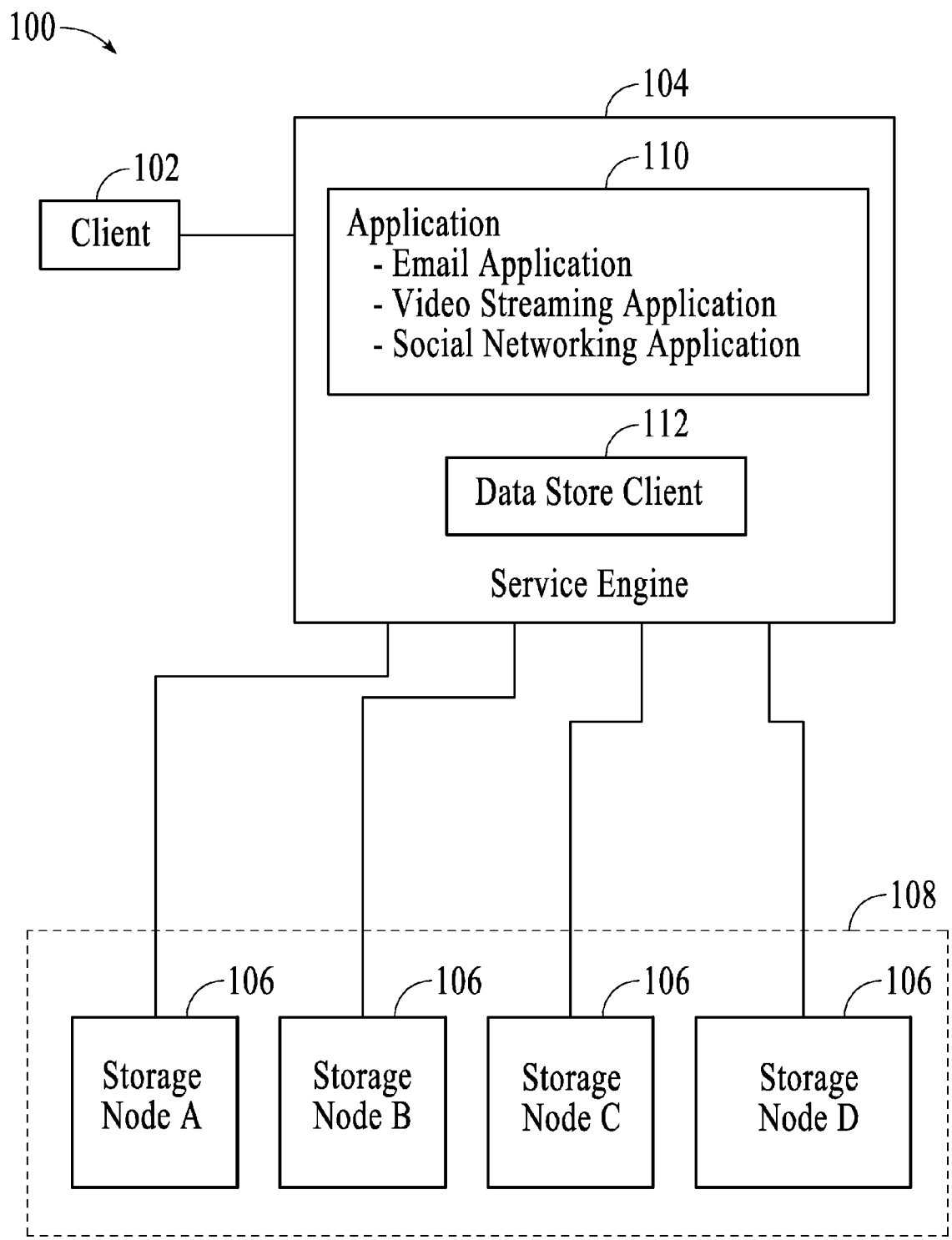
FIG. 1 depicts a system for storing digital data that is configured to efficiently manage BLObs.

FIG. 1 depicts a system 100 for storing digital data that is configured to efficiently manage BLObs. The system includes a client 102, a service engine 104, and multiple storage nodes 106.

In the embodiment of FIG. 1, the client 102 is an entity that is a source of a BLOb. For example, the client may include a mobile device, a desktop computer, a laptop computer, a server, a workstation, or a digital camera (video or still). The client may be embodied as software that runs on a hardware device, such as a mobile device, a desktop computer, a laptop computer, a server, a workstation, or a digital camera (video or still). For example, the client may be embodied as an application, such as a Web Browser that enables interaction with the service engine. Although only one client is shown in FIG. 1, multiple clients may have access to the service engine. Additionally, access to the service engine may be, for example, wired, wireless, or a combination of wired and wireless.

The storage nodes 106 are storage systems that provide storage for digital data. In an embodiment, the storage nodes are individual machines, such as storage servers, that communicate with the service engine 104 via data networking protocols such as Ethernet and/or the Internet Protocol (IP). All of the storage nodes that provide storage for the service engine are considered to be in the same "cluster" 108 of storage nodes even though the storage nodes may be located remote from the service engine and remote from each other. Each storage node in the cluster operates independently of the other storage nodes in the cluster. The independence of the storage nodes ensures that the distributed key-value storage system is not dependent on any one storage node and allows additional storage nodes to be easily added to the cluster. Although four storage nodes are depicted in FIG. 1, the cluster of storage nodes may include more than four storage nodes. In particular, the cluster of storage nodes may include a number of storage nodes greater than two.

The service engine 104 provides a service to the client 102, for example, an email service, a video streaming service, or a social networking service. In the embodiment of FIG. 1, the service engine includes an application 110 and a data store client 112. The application may be, for example, an email application, a video streaming application, or a social networking application. The application provides an interface to the client that allows the client to upload digital media (from the client to the application) and/or download digital media (from the application to the client). For example, the client can upload and download BLObs, such as digital images and digital video.

The data store client 112 implements a distributed key-value storage system to manage the storage of data in, and the retrieval of data from, the cluster 108 of storage nodes 106. In an embodiment, BLObs are streamed between the application, the data store client, and the storage nodes. That is, BLObs and BLOb chunks are streamed in the sense that the data is processed at the application and the data store client without ever having to store an entire BLOb or BLOb chunk at one time. For example, BLOb data is received at an input side of the data store client and sent from an output side of the data store client without ever simultaneously storing an entire BLOb or BLOb chunk.

In an embodiment, the application 110 and the data store client 112 communicate data between each other using an application programming interface (API) that uses defined stream calls. In a BLOb storage operation, the API provides an input stream object and the application writes data buffers to the stream. The application does not need to declare the total length of the stream (e.g., the BLOb stream) to the data store client ahead of time, rather, the length of the stream (e.g., the BLOb stream) is discovered only when the application closes the input stream. In a BLOb retrieval operation, the API provides an output stream object from which the application reads until an end of the file call is returned.

In an embodiment, the distributed key-value storage system uses a data model that includes a table, which is a distributed multi-dimensional map indexed by a key. The key is a binary string with no size restriction and the value is a binary object that is highly structured. Keys can map to multiple values, which are grouped into column families. The column families are typically fixed when the distributed key-value storage system is configured, however, columns can be added to a family at any time. Additionally, columns can be added only to specified keys and different keys can have different numbers of columns in any given family.

In an embodiment, a row key in a table is a string with no size restrictions, although typically, the row keys are 16-32 bytes long. Every operation under a single row key is atomic per replica no matter how many columns are being read from or written into. In an embodiment, the top dimension in the table is called the "keyspace" and the distributed key-value storage system exposes two kinds of column families, simple column families and super column families. In an embodiment, the distributed key value storage system can handle tables with four or five dimensions. A table with four dimensions is defined as follows:
 1. Keyspace→Column Family
 2. Column Family→Column Family Row
 3. Column Family Row→Columns
 4. Column→Data
A table with five dimensions is defined as follows:
 1. Keyspace→Super Column Family
 2. Super Column Family→Super Column Family Row
 3. Super Column Family Row→Super Columns
 4. Super Column→Columns 5. Column→Data In an embodiment, the first dimension of the table, Keyspace→Column Family or Keyspace→Super Column Family, is limited to a small set of schema-predefined keys. Applications can specify the sort order of columns within a Column Family or a Super Column Family. Columns can be sorted by either time or name.

In an embodiment, the distributed key-value storage system that is implemented by the data store client distributes data across the cluster of storage nodes using consistent hashing. For example, the output range of a hash function is treated as a fixed circular space or "ring," and each storage node in the cluster is assigned a random value within this space to represent the storage node's position in the ring. Each data entity that is identified by a key is assigned to a storage node by hashing the key associated with the data entity. The result of the hashing determines a position on the ring, and a storage node is selected by traversing the ring, e.g., clockwise, to find the first node with a position larger than the data entity's position. A more detailed description of distributed key-value storage systems is found in the following papers: *Cassandra—A Decentralized Structured Storage System*, Avinash Lakshman and Prashant Malik, 2009; *Dynamo: Amazon's Highly Available Key-value Store*, Giuseppe DeCandia, Deniz Hastorun, Madan Jampani, Gunavardhan Kakulapati, Avinash Lakshman, Alex Pilchin, Swaminathan Sivasubramanian, Peter Vosshall, and Werner Vogels, SOSP '07, Oct. 14-17, 2008; and *Bigtable: A Distributed Storage System for Structured Data*, Fay Chang, Jeffrey Dean, Sanjay Ghemawat, Wilson C. Hsieh, Deporah A. Wallach, Mike Burrows, Tushar Chandra, Andrew Fikes, and Robert E. Gruber, Operating Systems Design and Implementation (OSDI), 2006; all of which are incorporated by reference herein.

In accordance with an embodiment of the invention, BLObs that are uploaded from the client 102 to the service engine 104 are divided into smaller "BLOb chunks," which are stored in the cluster 108 of storage nodes 106 using a distributed key-value storage system. In order to ensure that a BLOb can be managed as a single entity even though the BLOb is divided into BLOb chunks, a BLOb is first associated with a row key, referred to as a "BLOb key," and each subsequent BLOb chunk is associated with a unique row key, referred to as a "BLOb chunk key." A list of the BLOb chunk keys is maintained so that the BLOb can continue to be managed as a single entity. In particular, a BLOb chunks key list is maintained within the first BLOb chunk so that all of the BLOb chunks of the BLOb can be easily retrieved from the distributed key-value storage system.

Figure 2:
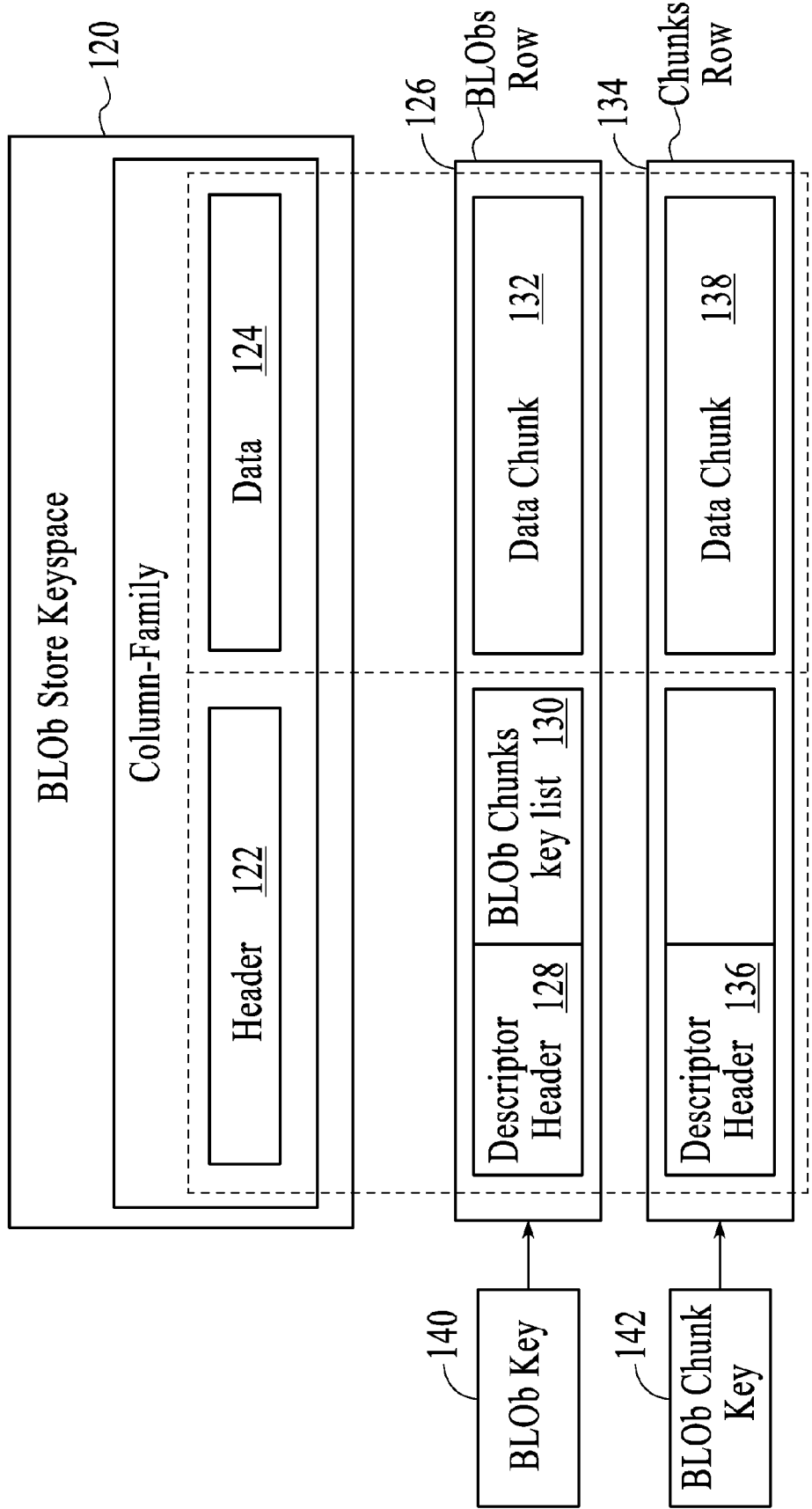
FIG. 2 depicts an embodiment of a data model for BLOb storage in accordance with an embodiment of the invention.

FIG. 2 depicts an embodiment of a data model for BLOb storage in accordance with an embodiment of the invention. The keyspace 120, referred to as the "BLOb store keyspace," includes two Column Families, "BLObs" and "Chunks," with each column family having a header column 122 and a data column 124. The data model also includes two classes of object rows, a "BLObs" row and a "Chunks" row. The BLOb chunk 126 in a BLObs row includes a descriptor header 128 and a BLOb chunks key list 130 in the header column and a data chunk 132 in the data column and the BLOb chunk 134 in a Chunks row includes a descriptor header 136 in the header column and data chunk 138 in the data column.

In an embodiment, the descriptor headers 128, 136 include metadata for the corresponding BLOb or BLOb chunk. For example, the metadata may include the length of the BLOb or BLOb chunk, the owner of the BLOb or BLOb chunk, and the creation time of the BLOb or BLOb chunk. The BLOb chunks key list 130 includes an ordered list of all of the BLOb chunks that make up the BLOb.

As illustrated in FIG. 2, the BLObs rows are indexed by a BLOb key 140 and the Chunks rows are indexed by a BLOb chunk key 142. In an embodiment, the BLOb key includes a name and an arbitrary value and the Blob chunk keys include the corresponding BLOb key and another unique value, such as an ordinal suffix. In an embodiment, the keys are generated by the data store client.

Figure 3A:
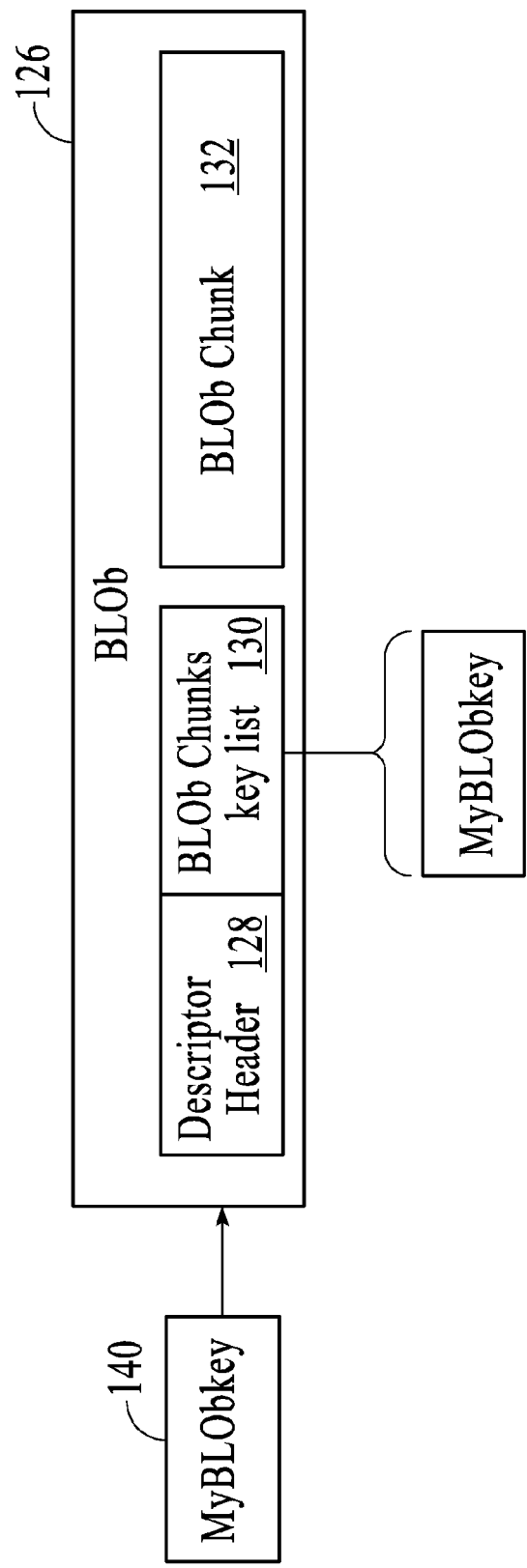

FIGS. 3A-3D illustrate the generation of BLOb chunks and the BLOb chunks key list as a BLOb is processed through a service engine, such as the service engine 140 of FIG. 1. FIG. 3A illustrates the first BLOb chunk 126, BLOb, that is generated as a BLOb is streamed from the application 110 to the data store client 112. The first BLOb is maintained at the BLObs row level and is indexed by a BLOb key 140, identified in FIG. 3A as "MyBLObKey." The BLOb chunk also includes a key list in the header. At the point at which only the first BLOb chunk exists, the BLOb key list contains only the BLOb key, MyBLObKey, as shown in the expanded view of the BLOb key list. In the embodiment of FIG. 3A, the first BLOb chunk includes a first chunk of the BLOb, e.g., a first portion of the digital media that makes up the BLOb, in the data column. Including a first portion of the BLOb data in the initial BLOb chunk helps to speed up the storage and retrieval process. In other embodiments, the first BLOb chunk may not include any BLOb data in the data column.

As a BLOb is streamed from the application 110 to the data store client 112, the amount of data that has been streamed is tracked. Once the amount of streamed data reaches a pre-established size limit, the BLOb chunk is "closed" and the BLOb chunk is stored in the distributed key-value storage system according to the corresponding BLOb key. For example, the BLOb key is hashed to determine the location within the cluster 108 at which the BLOb chunk is to be stored.

Figure 3B:
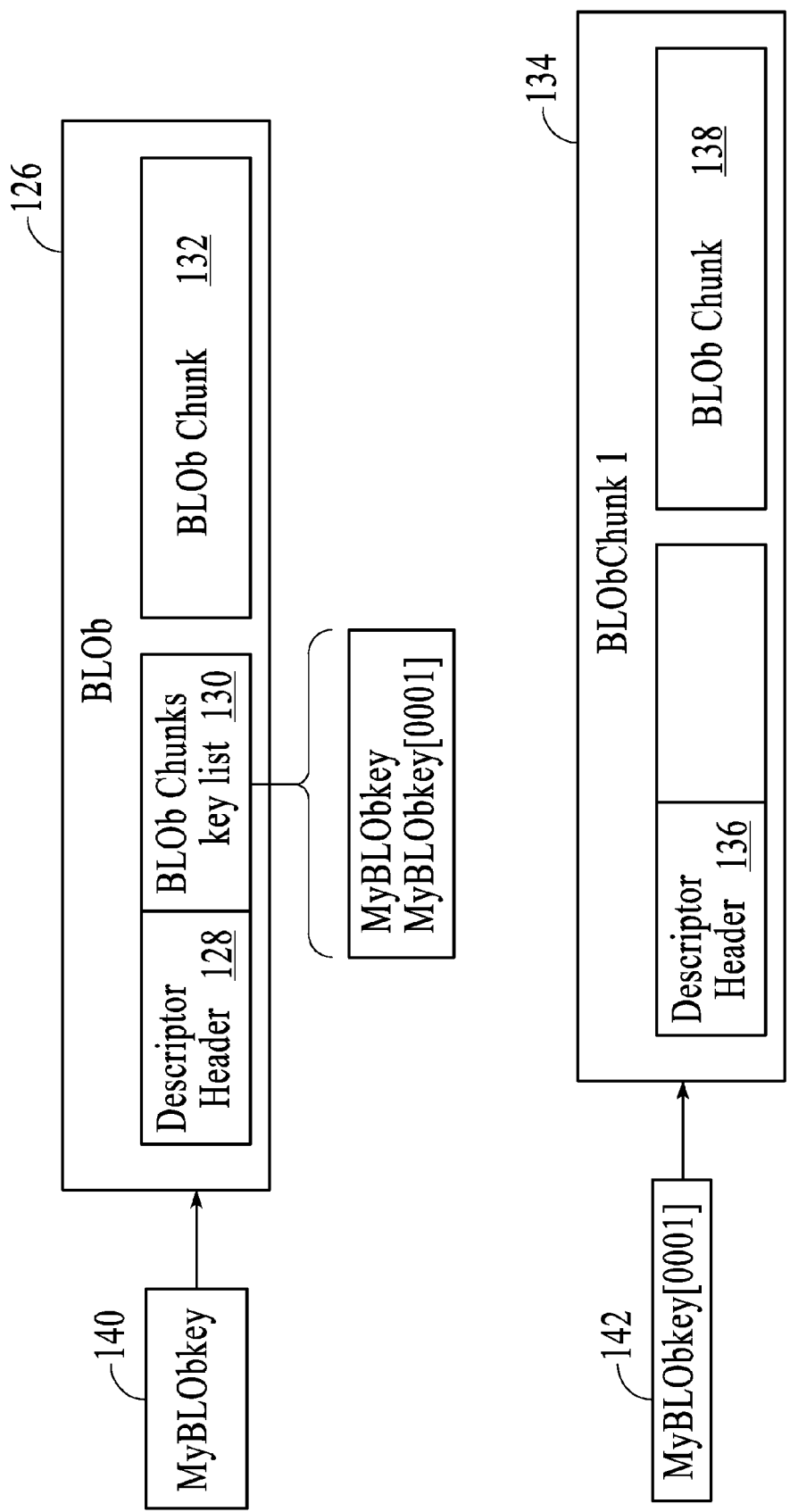

Immediately upon the closing of the initial BLOb chunk, a new BLOb chunk 134 is created and the BLOb stream "fills" the new BLOb chunk from the point at which the initial BLOb chunk was closed. All of the BLOb chunks that are created after the initial BLOb chunk are indexed at the Chunks row level. In an embodiment, the subsequent BLOb chunks are associated with BLOb chunk keys that include the initial BLOb chunk key and an ordinal suffix. For example, the next BLOb chunk, BLObChunk1, is associated with the BLOb chunk key, "MyBLObKey[0001]." FIG. 3B illustrates the next BLOb chunk and its associated BLOb chunk key 142. Once the BLOb chunk reaches its pre-established size limit, the BLOb chunk is "closed" and the BLOb chunk is stored in the distributed key-value storage system according to the BLOb key. For example, the BLOb chunk key is hashed to determine the storage node at which the BLOb chunk will be stored. Additionally, the BLOb chunk key is added to the BLOb chunks key list as illustrated in the expanded view of the BLOb chunks key list. In an embodiment, an updated BLOb chunks key list is sent to the storage node that stores the initial BLOb chunk and the BLOb chunks key list is replaced with, or updated according to, the updated BLOb chunks key list.

Figure 3C:
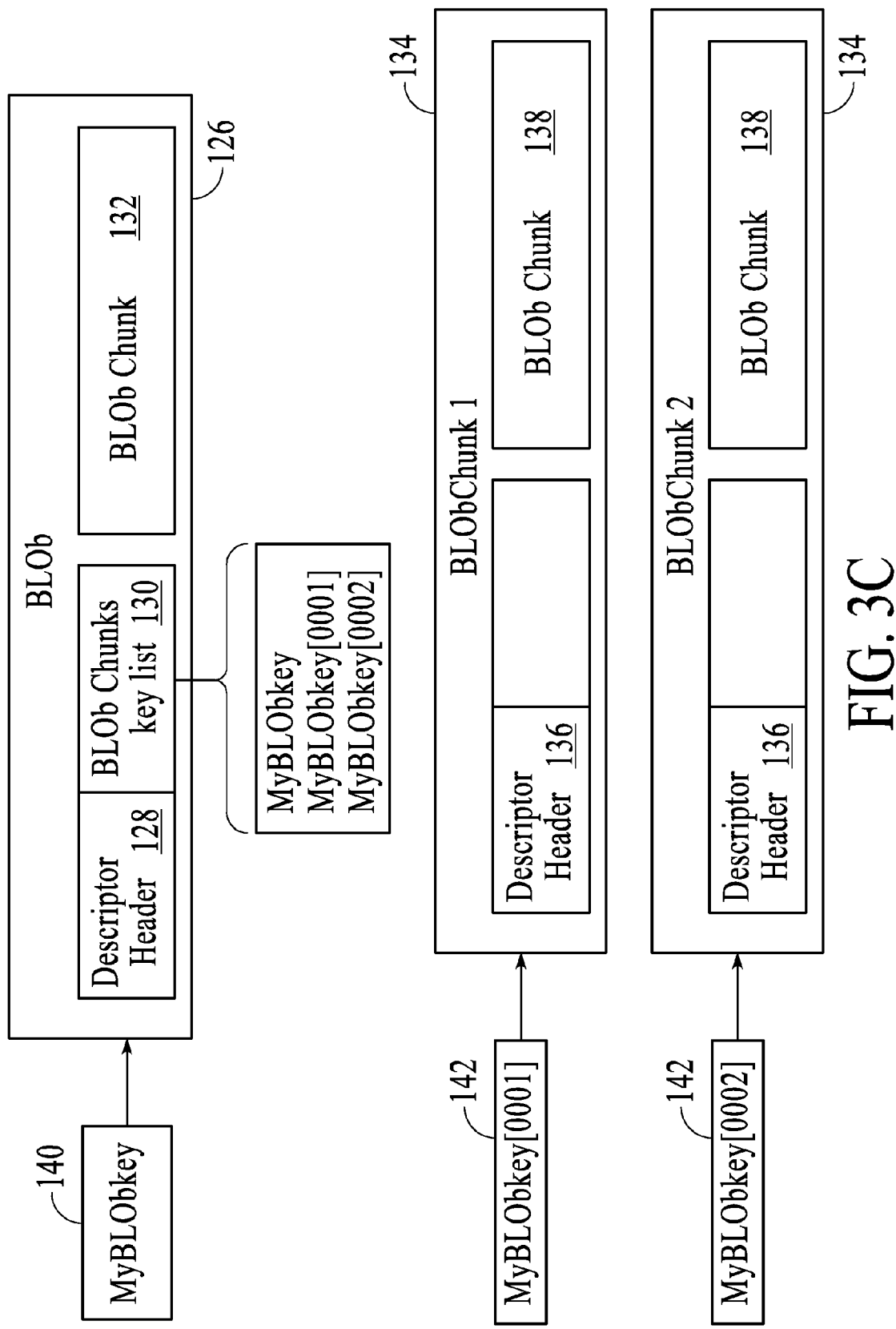

Immediately upon the closing of BLObChunk1, a new BLOb chunk 134 is created and the BLOb stream "fills" the new BLOb chunk from the point at which BLObChunk1 was closed. The next BLOb chunk, BLObChunk2, is associated with the BLOb chunk key, "MyBLObKey[0002]." FIG. 3C illustrates the next BLOb chunk and its associated BLOb chunk key. Once the BLOb chunk reaches its pre-established size limit, the BLOb chunk is "closed" and the BLOb chunk is stored in the distributed key-value storage system according to the BLOb key 142. For example, the BLOb chunk key is hashed to determine the storage node at which the BLOb chunk will be stored. Additionally, the BLOb chunk key is added to the BLOb chunks key list as illustrated in the expanded view of the BLOb chunks key list. In an embodiment, an updated BLOb chunks key list is sent to the storage node that stores the initial BLOb chunk and the BLOb chunks key list is replaced with, or updated according to, the updated BLOb chunks key list.

Immediately upon the closing of BLObChunk2, a new BLOb chunk 134 is created and the BLOb stream "fills" the new BLOb chunk from the point at which BLObChunk2 was closed. This process continues until the end of the BLOb is reached, at which point the last BLOb chunk is generated. The last BLOb chunk, BLObChunkN, is associated with the BLOb chunk key, "MyBLObKey[nnnn]" FIG. 3D illustrates the last BLOb chunk and its associated BLOb chunk key 142. Although the previous BLOb chunks are fixed at the pre-established size limit, the last BLOb chunk may not reach the pre-established size limit before the end of the BLOb is reached. Regardless, once the end of the BLOb is reached, the BLOb chunk is "closed" and the BLOb chunk is stored in the distributed key-value storage system according to the BLOb key. For example, the BLOb chunk key is hashed to determine the storage node at which the BLOb chunk will be stored. Additionally, the BLOb chunk key is added to the BLOb chunks key list as illustrated in the expanded view of the BLOb chunks key list. In an embodiment, an updated BLOb chunks key list is sent to the storage node that stores the initial BLOb chunk and the BLOb chunks key list is replaced with, or updated according to, the updated BLOb chunks key list.

Figure 4A:
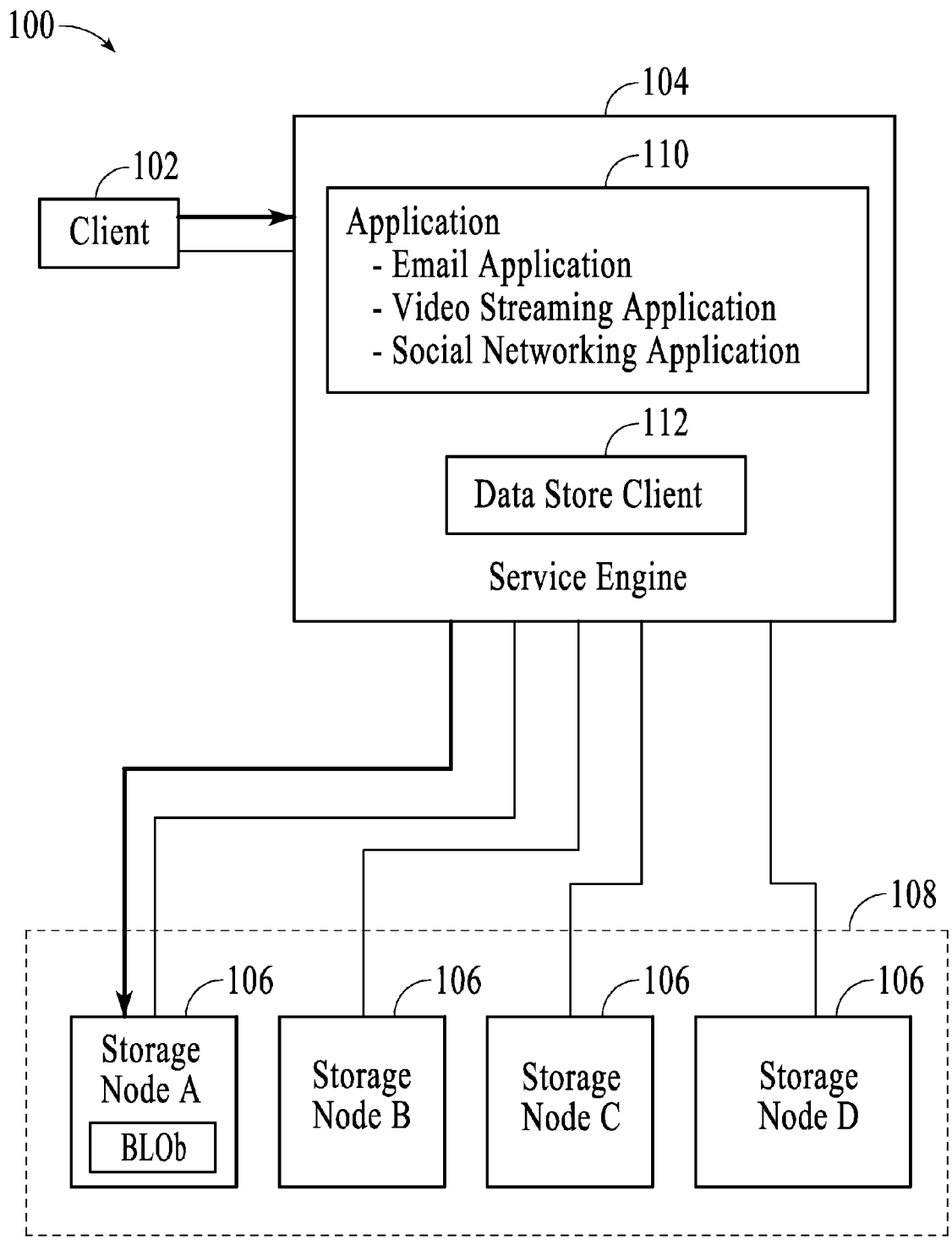
FIGS. 4A-4D illustrate the distribution of BLOb chunks within a cluster of storage nodes.

FIGS. 4A-4D illustrate the distribution of BLOb chunks within the cluster 108 of storage nodes 106. As described above, as a BLOb is streamed from the application 110 to the service engine 112, the BLOb is divided into BLOb chunks and the BLOb chunks are stored according to the hashing of the corresponding BLOb chunk key values. FIG. 4A illustrates the initial BLOb chunk 126, BLOb, being stored at storage node A.

Figure 4B:
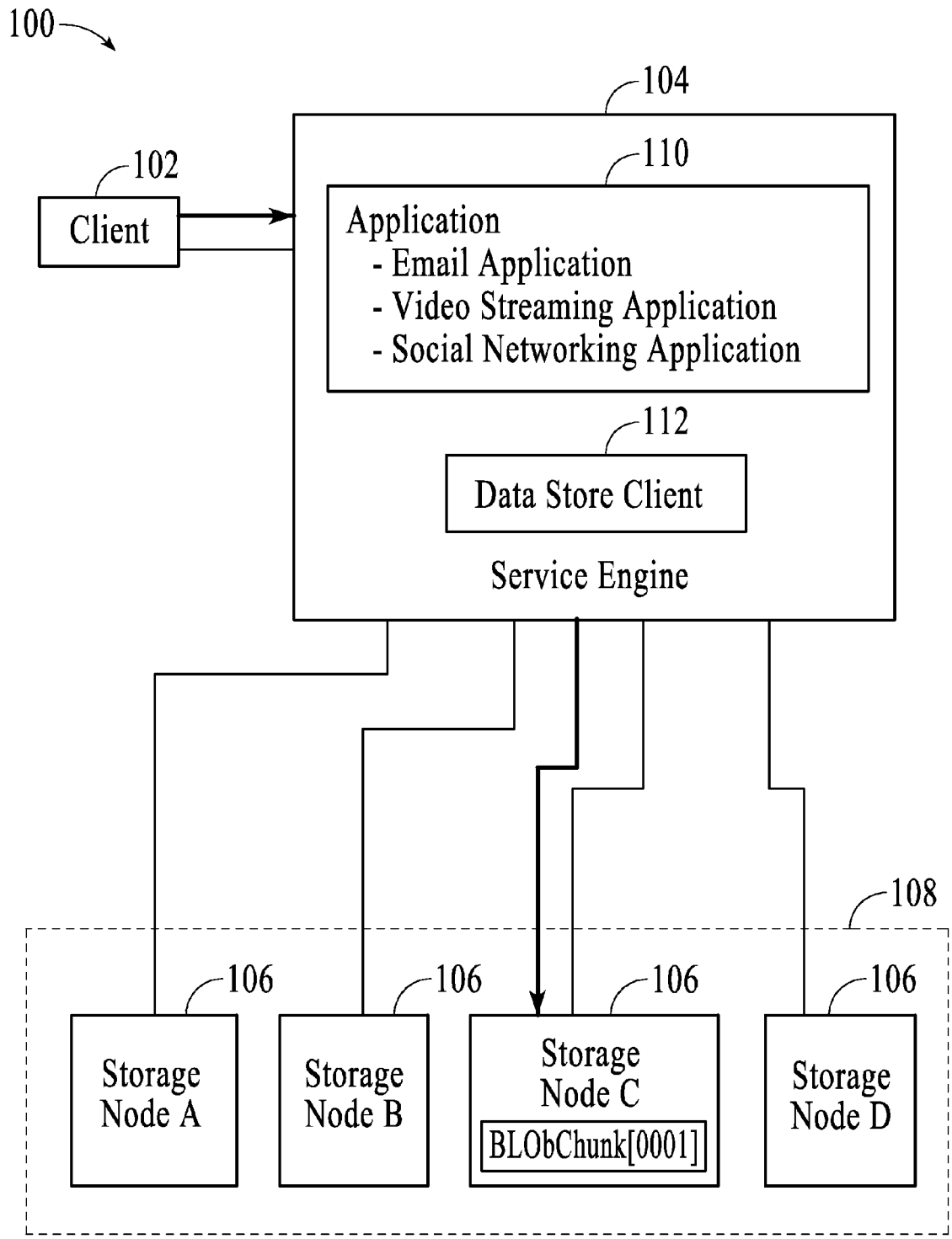
Figure 4C:
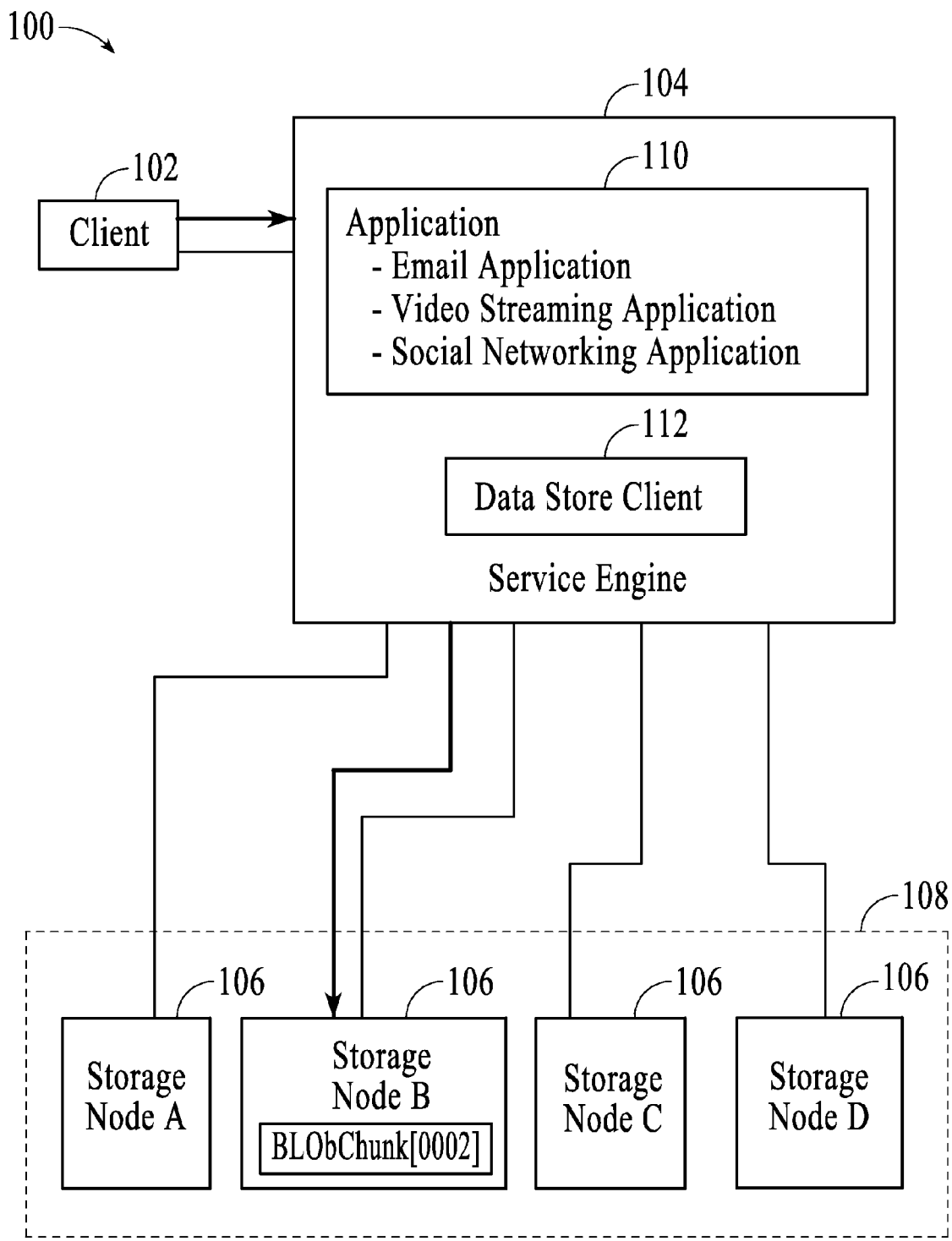
Figure 4D:
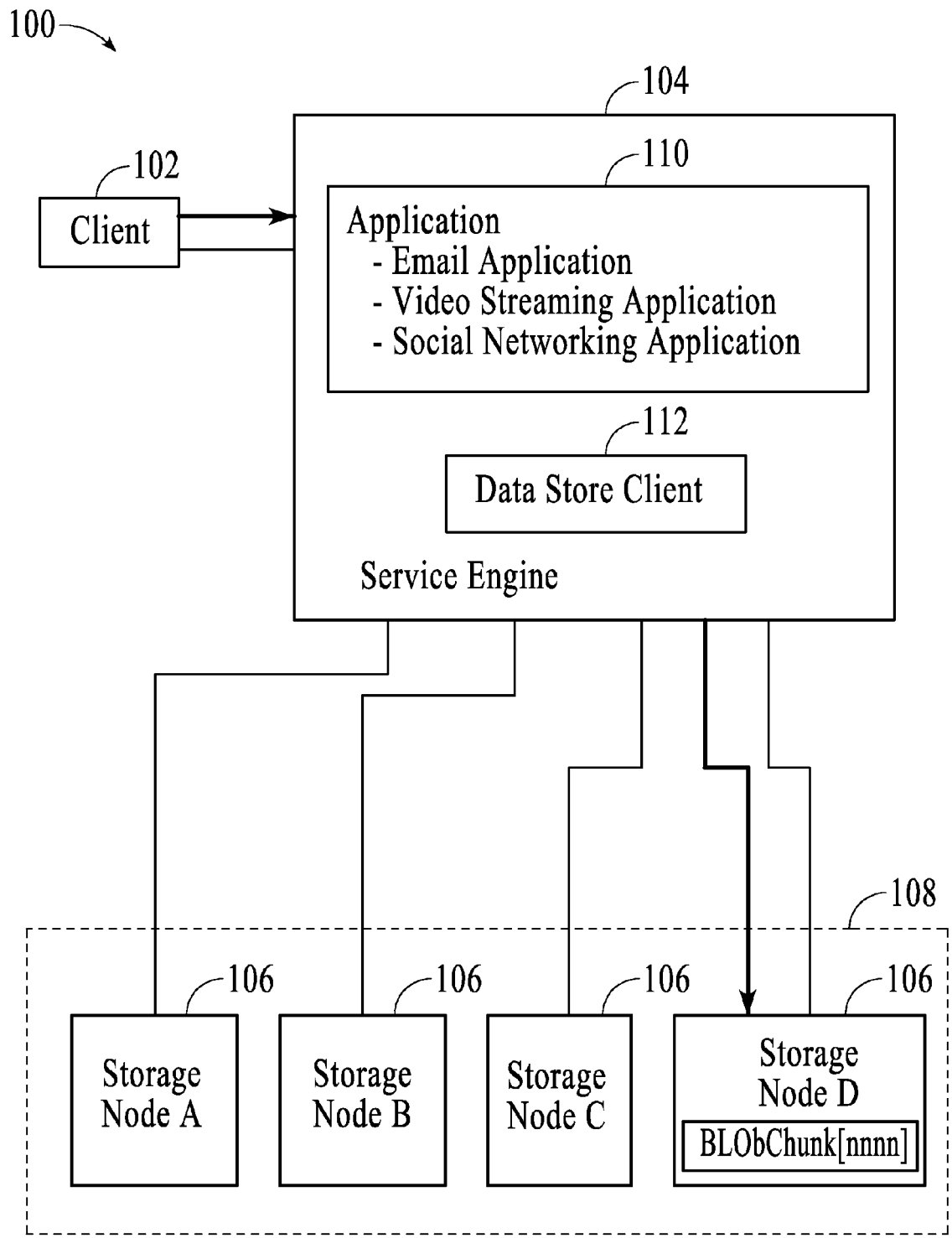

FIG. 4B illustrates the next BLOb chunk 134, BLOb-Chunk1, being stored at storage node C 106. As described above, storage nodes are selected by hashing the BLOb chunk keys, so over time, storage of the BLOb chunks is distributed amongst the storage nodes. FIG. 4C illustrates the next BLOb chunk, BLObChunk2, being stored at storage node B and FIG. 4D illustrates the last BLOb chunk, BLObChunkN, being stored at storage node D.

In an embodiment, the size of BLOb chunks is programmable. That is, the pre-established size limit can be set to a value that best suits the specific use case. In an embodiment, the pre-established size limit of a BLOb chunk can be programmed in response to various criteria, including, characteristics of the BLOb, application type, network conditions, service level, security characteristics, compression characteristics, etc. Additionally, the pre-established size limit can be adapted to adjust to changing conditions. Further, different pre-established size limits can be set for different combinations of the application type, BLOb type, network conditions, services levels, security characteristics, compression characteristics, etc.

BLOb chunks are retrieved from the distributed key-value storage system by obtaining a key for the BLOb and indexing the key-value storage system table to find the initial BLOb chunk. The initial BLOb chunk includes the BLOb chunks key list and may include some data of the BLOb. The rest of the BLOb data is located in the distributed key-value storage system using the BLOb chunk keys that are found in the BLOb chunks key list. In an embodiment, a method for retrieving BLObs from a distributed key-value storage system involves, obtaining a BLOb key, indexing a table according to the BLOb key to find a value, obtaining a BLOb chunks key list from the value, wherein the BLOb chunks key list contains BLOb chunks keys that are related to BLOb chunks of the BLOb, using the BLOb chunk keys to index the table, and streaming BLOb chunks of the BLOb according to the BLOb chunk keys.

Because a BLOb is divided into BLOb chunks that are indexed by the BLOb chunks keys, each BLOb can be individually identified and retrieved from the storage nodes. This enables "seek" or "skip" functionality to be implemented. For example, various points in the BLOb can be directly accessed to retrieve a BLOb from the BLOb chunk that corresponds to the desired point in the BLOb. In an embodiment, if a BLOb of video data is divided into 20 BLOb chunks, the midway point in the video can be immediately retrieved from the distributed key-value storage system by jumping to the tenth BLOb chunk and retrieving BLOb chunks ten through twenty.

Figure 5:
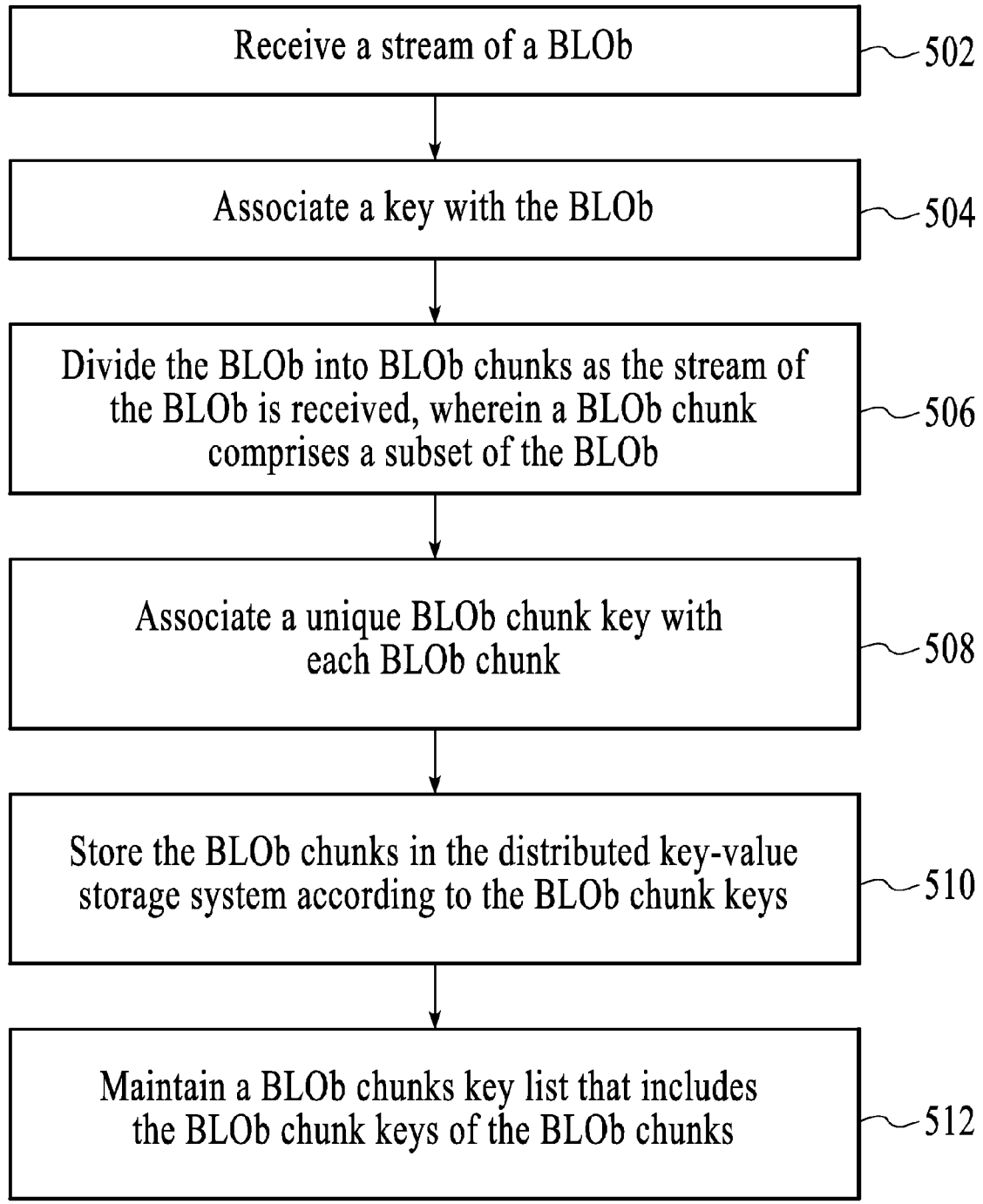
FIG. 5 depicts a process flow diagram of a method for storing BLObs in a distributed key-value storage system in accordance with an embodiment of the invention.

FIG. 5 depicts a process flow diagram of a method for storing BLObs in a distributed key-value storage system in accordance with an embodiment of the invention. At block 502, a stream of a BLOb is received, e.g., at the service engine. At block 504, a key is associated with the BLOb. At block 506, the BLOb is divided into BLOb chunks as the stream of the BLOb is received, wherein a BLOb chunk comprises a subset of the BLOb. At block 508, a unique BLOb chunk key is associated with each BLOb chunk. At block 510, the BLOb chunks are stored in the distributed key-value storage system according to the BLOb chunk keys. At block 512, a BLOb chunks key list, which includes the BLOb chunk keys of the BLOb chunks, is maintained.

Figure 6:
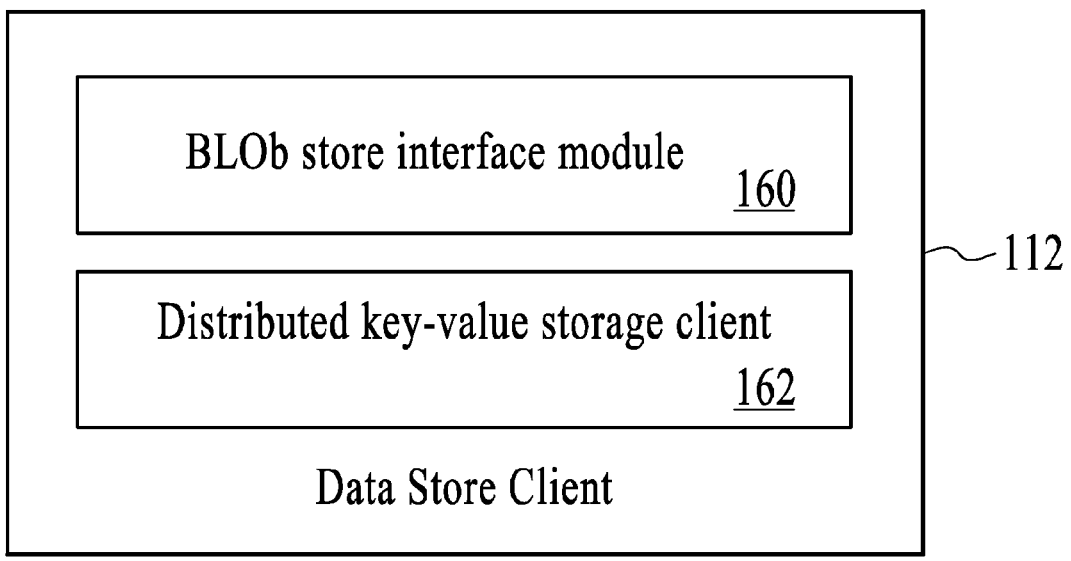
FIG. 6 depicts an expanded view of the data store client of FIG. 1, which includes a BLOb store interface module and a distributed key-value store client.

FIG. 6 depicts an expanded view of the data store client 112 of FIG. 1, which includes a BLOb store interface module 160 and a distributed key-value store client 162. In the embodiment of FIG. 6, the BLOb store interface module implements the chunking of BLObs and maintains the BLOb chunks key list as described above and the distributed key-value storage system implements a distributed key-value storage technique as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing computer executable instructions, or program code, for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 7:
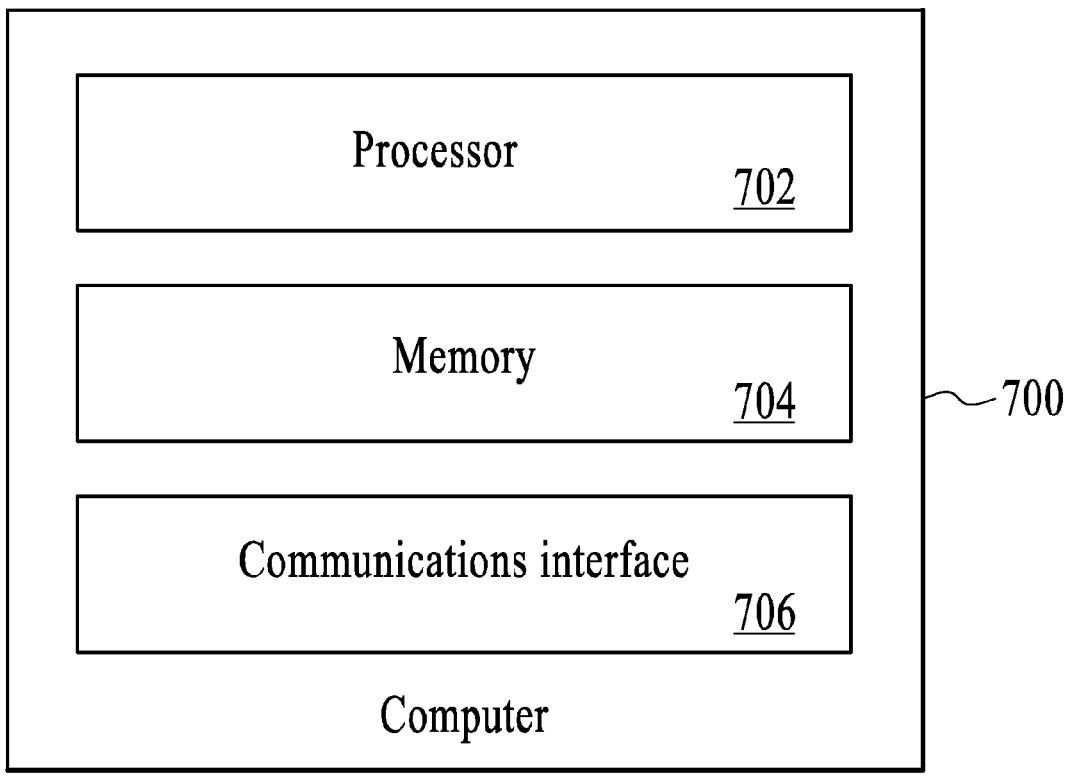
FIG. 7 depicts a computer that includes a processor, memory, and a communications interface.

In an embodiment, the functionality of the data store client of FIGS. 1-6 is performed by a computer, such as a server, which executes computer readable instructions. FIG. 7 depicts a computer 700 that includes a processor 702, memory 704, and a communications interface 706. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for storing binary large objects (BLObs) of multimedia streams in a distributed key-value storage system, the method comprising:
    receiving a stream of a BLOb;
    associating a key with the BLOb;
    dividing the BLOb into BLOb chunks as the stream of the BLOb is received, wherein a BLOb chunk comprises a subset of the BLOb, and a BLOb chunk can be stored before the entire stream of the BLOb has been received;
    associating a unique BLOb chunk key with each BLOb chunk;
    storing the BLOb chunks in the distributed key-value storage system according to the BLOb chunk keys;
    maintaining a BLOb chunks key list that includes the BLOb chunk keys of the BLOb chunks;
    wherein the distributed key-value storage system comprises multiple storage nodes, wherein the BLOb chunk key of each particular BLOb chunk is hashed to determine the storage node at which the particular BLOb chunk is stored, and wherein the BLOb is divided into at least two BLOb chunks and the BLOb chunks key list is stored in a first BLOb chunk of the at least two BLOb chunks; and
    retrieving the BLOb from the distributed key-value storage system using the BLOb chunks key list, wherein retrieving comprises streaming and direct seek according to the BLOb chunks key list.

2. The method of claim 1, wherein the BLOb chunk keys comprise the BLOb key and an ordinal suffix.

3. The method of claim 1, wherein the BLOb chunks key list is maintained in a header portion of an object.

4. The method of claim 1, further comprising updating the BLOb chunks key list to include all of the BLOb chunk keys of the BLOb.

5. The method of claim 1, further comprising updating the BLOb chunks key list upon the creation of each subsequent BLOb chunk.

6. The method of claim 1, wherein the BLOb chunks have a pre-established maximum size.

7. The method of claim 1, wherein the distributed key-value storage system comprises a ring of multiple storage nodes and wherein the BLOb chunk key of a particular BLOb chunk is hashed to determine the position in the ring at which the BLOb chunk is stored.

8. The method of claim 7, further comprising retrieving the BLOb from the storage nodes of the distributed key-value storage system according to the BLOb chunk keys that are stored in the BLOb chunks key list.

9. A non-transitory storage medium that stores computer executable instructions, which when executed by a computer, implement a method for storing binary large objects (BLObs) of multimedia streams in a distributed key-value storage system, the method comprising:
    receiving a stream of a BLOb;
    associating a key with the BLOb;
    dividing the BLOb into BLOb chunks as the stream of the BLOb is received, wherein a BLOb chunk comprises a subset of the BLOb, and a BLOb chunk can be stored before the entire stream of the BLOb has been received;
    associating a unique BLOb chunk key with each BLOb chunk;
    storing the BLOb chunks in the distributed key-value storage system according to the BLOb chunk keys;
    maintaining a BLOb chunks key list that includes the BLOb chunk keys of the BLOb chunks;
    wherein the distributed key-value storage system comprises multiple storage nodes, wherein the BLOb chunk key of each particular BLOb chunk is hashed to determine the storage node at which the particular BLOb chunk is stored, and wherein the BLOb is divided into at least two BLOb chunks and the BLOb chunks key list is stored in a first BLOb chunk of the at least two BLOb chunks; and
    retrieving the BLOb from the distributed key-value storage system using the BLOb chunks key list, wherein retrieving comprises streaming and direct seek according to the BLOb chunks key list.

10. The non-transitory storage medium of claim 9, wherein the BLOb chunk keys comprise the BLOb key and an ordinal suffix.

11. The non-transitory storage medium of claim 9, further storing computer executable instructions, which when executed by the computer, implement a method that includes updating the BLOb chunks key list to include all of the BLOb chunk keys of the BLOb.

12. The non-transitory storage medium of claim 9, further storing computer executable instructions, which when executed by the computer, implement a method that includes updating the BLOb chunks key list upon the creation of each subsequent BLOb chunk.

13. The non-transitory storage medium of claim 9, wherein the BLOb chunks have a pre-established maximum size.

14. The non-transitory storage medium of claim 9, further storing computer executable instructions, which when executed by the computer, implement a method that includes retrieving the BLOb from the storage nodes of the distributed key-value storage system according to the BLOb chunk keys that are stored in the BLOb chunks key list.

* * * * *